United States Patent [19]

Hirata et al.

[11] Patent Number: 4,581,711

[45] Date of Patent: Apr. 8, 1986

[54] MONITORING SYSTEM FOR MOTORS

[75] Inventors: Kinya Hirata; Yoshio Torisawa, both of Nagoya, Japan

[73] Assignee: Kabushiki Kaisha Okuma Tekkosho, Nagoya, Japan

[21] Appl. No.: 456,725

[22] Filed: Jan. 10, 1983

[30] Foreign Application Priority Data

Apr. 1, 1982 [JP] Japan ................................ 57-54711

[51] Int. Cl.⁴ ...................... G05B 13/04; G08B 21/00
[52] U.S. Cl. .................... 364/550; 318/434;
340/664; 361/31; 364/150; 364/185
[58] Field of Search ...................... 318/434; 340/664;
361/31; 364/150, 184, 185, 481, 483, 550

[56] References Cited

U.S. PATENT DOCUMENTS 3,955,130  5/1976  Graf ................................ 318/434 X
4,290,000  9/1981  Sun ................................. 318/434 X Primary Examiner—Errol A. Krass
Assistant Examiner—Edward R. Cosimano
Attorney, Agent, or Firm—Wenderoth, Lind & Ponack

[57] ABSTRACT

When a load current on a motor was to be monitored, all the digital values of the load current at the model operation were conveniently memorized in a memory to be compared with the load current value of the actual operation. The capacity of the memory therefore became enormous, presenting a problem. This invention enables to memorize a load current of a motor at the model operation in terms of the dimensional difference from a reference value and of duration of time. Thanks to such an arrangement, the volume of stored data can be reduced to minimize the capacity of the memory, thereby facilitating the comparison process of data at the time of actual operation.

18 Claims, 5 Drawing Figures

FIG. I
PRIOR ART
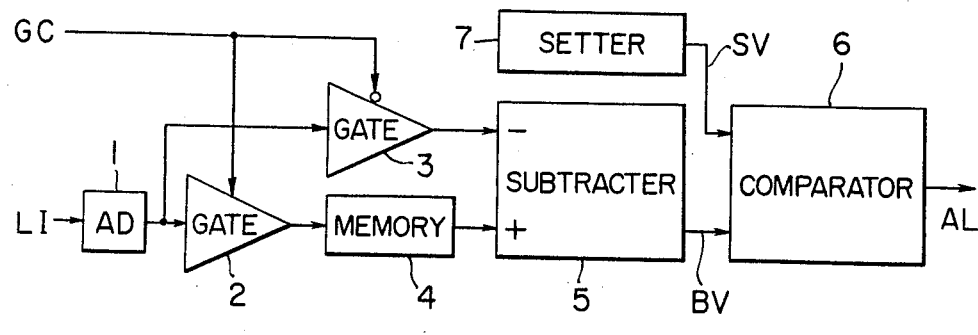
FIG. 2
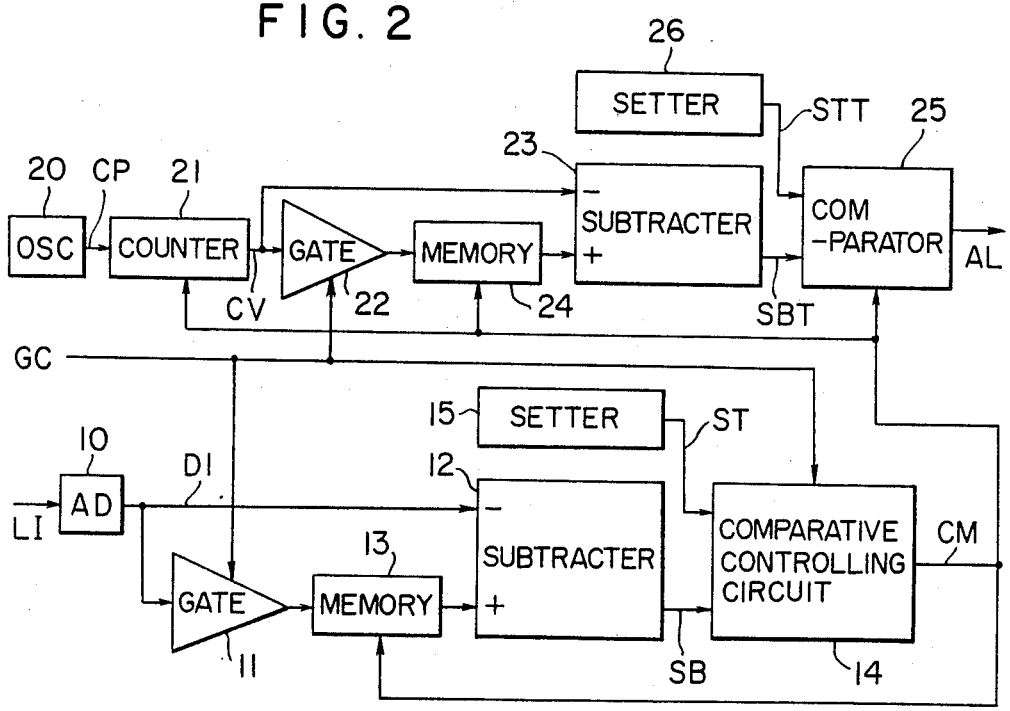

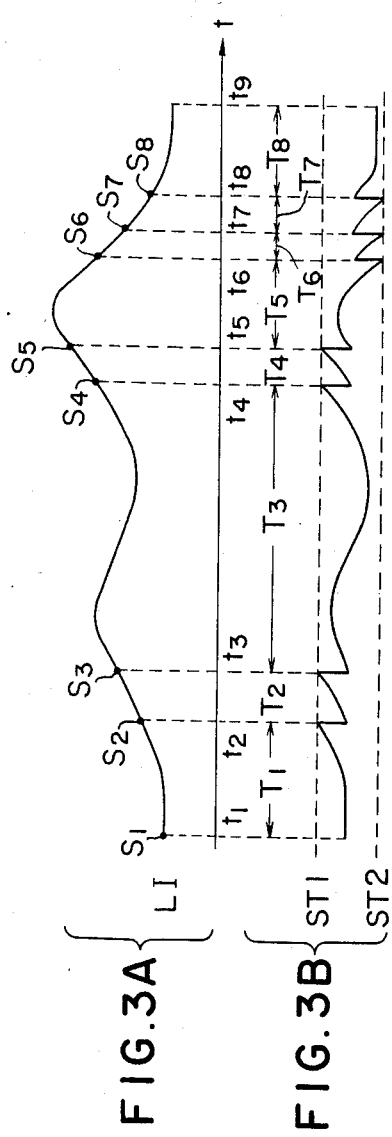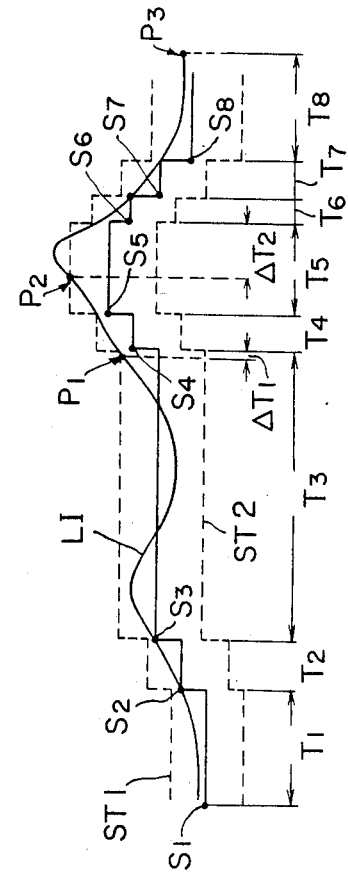

MONITORING SYSTEM FOR MOTORS

BACKGROUND OF THE INVENTION

This invention relates to a monitoring method and the system thereof for comparing the load current of a motor detected during operation with the load current thereof memorized during model operation and for watching out for overload of the motor.

Conventional systems such as the one shown in FIG. 1 have been proposed as monitoring apparatus. In the apparatus the load current LI of a motor is made to be applied to gates 2 and 3 through an AD converter 1, and when the apparatus is switched to model operation by a gate switch signal GC, a memory 4 is made to store the current value via the gate 2 and when the apparatus is operated at actual operation, the current value is input in a subtracter 5 via the gate 3. At the time of a normal operation, the subtracter 5 computes difference between the load current value of the model operation stored in the memory 4 and the current value at the actual operation transmitted from the gate 3 to obtain a subtraction value BV, a comparator 6 compares the subtraction value BV with a set value SV prescribed at a setter 7, and if the subtraction value BV is greater than the prescribed value SV, the comparator 6 outputs an alarm signal AL. The prior art apparatus, however, is defective in that the capacity of the memory 4 becomes enormous since load current values of the motor are AD-converted and all of those values are stored in the memory 4. That leads to such inconvenience as to require additional expensive exterior memory devices such as magnetic tapes.

SUMMARY OF THE INVENTION

Accordingly, an object of this invention is to provide a monitoring system for a motor which can be built with a memory of the minimal size so as to reduce the cost of the apparatus.

Another object of this invention is to provide a monitoring method for a motor of memorizing the load current of a motor at the time of model operation in terms of the difference from a reference value and the time duration in order to reduce the amount of stored data and to facilitate the process of comparison.

The nature, principle and utility of the invention will become more apparent from the following detailed description when read in conjunction with the accompanying drawings.

BRIEF DESCRIPTION OF THE DRAWINGS

In the accompanying drawings:

FIG. 1 shows a block diagram of an example of prior art mintoring system for a motor;

FIG. 2 is a block diagram of an embodiment according to this invention; and

FIGS. 3A, 3B and FIG. 4 are timing charts to show examples of operation by the system according to this invention, respectively.

DETAILED DESCRIPTION OF THE INVENTION

FIG. 2 shows an embodiment according to this invention wherein a load current LI of a motor is converted into a digital current value DI by an AD converter 10, the digital current value DI is transmitted into a gate 11 and into a subtracter 12 simultaneously. The gate 11 is controlled by a gate switch signal GC, the digital current value DI is input into a memory 13 through the gate 11 at the time of model operation, and the result of subtraction SB is input from a subtracter 12 into a comparative controlling circuit 14 so as to be compared with a set value ST from a setter 15. A pulse oscillator 20 outputs a clock pulse CP of a predetermined frequency which is counted by a counter 21. The counted value which shows time data CV is input into a gate 22 as well as into a subtracter 23. A gate switch signal GC is at the same time input into a gate 22, the value CV counted by the counter 21 at the time of model operation is input into a memory 24 whose output is input to the subtracter 23 and, the subtraction value SBT calculated by the subtracter 23 is input into a comparator 25. The comparator 25 compares the subtraction value SBT sent from the subtracter 23 with a permissible time STT which has been set by a setter 26 and outputs an alarm signal AL if the subtraction value SBT exceeds the permissible time STT. The gate switch signal GC is input into the comparative controlling circuit 14, too, so that the output CM from the circuit 14 controls the memories 13 and 24, the comparator 25 and the counter 21, respectively.

The operation of the system constructed as described above will now be explained referring to the time charts shown in FIGS. 3A, 3B and FIG. 4.

The prescribed value ST of the setter 15 is set as indicated in FIG. 3B at a point between the maximum value $ST_1$ and the minimum value ST2, and the set value ST ($ST_1$ to $ST_2$) is made to input in the comparative controlling circuit 14. The permissible time STT of the setter 26 is set at $\Delta t$, the permissible time STT($\Delta t$) is input into the comparator 25. At the time of model operation, the gates 11 and 22 are actuated with the gate switch signal GC. When a load current LI of the motor is input as shown in FIG. 3A (after the time point $t_1$), that is converted into a digital current value DI by the AD converter 10 to be input into the memory 13 through the gate 11. Then, the subtracter 12 calculates the difference between the digital current value DI of the model operation and the initial position data $S_1$ and inputs the subtracted value SB to the comparative controlling circuit 14. The comparative controlling circuit 14 compares the subtracted value SB with a prescribed value ST from the setter 15, and if the subtraction value SB exceeds the prescribed value ST ($ST_1$ to $ST_2$) (as at the time point $t_2$), allocates, for instance, "1" to the comparison result CM and makes the memory 13 to store the load current $S_2$ of the time. The counter 21 counts the clock pulse CP from the pulse oscillator 20 from the time point $t_1$. The counted value CV of the counter 21 makes the memory 24 to store the time $T_1$ from the time point $t_1$ to the point $t_2$ through the gate 22. When the current value $S_2$ is stored in the memory 13, the output from the memory 13 is refreshed to become the value $S_2$ while the time $T_1$ is stored in the memory 24, the memory 24 is refreshed, thereby clearing the counter 21 with the comparison result CM.

Accordingly, the subtracter 12 calculates the difference SB between the output value $S_2$ of the memory 13 which has been refreshed and the digital current value DI from the AD converter 10, then the comparative controlling circuit 14 compares the difference SB with the presciped value ST from the setter 15 in the manner similar to the above, and the memory 13 memorizes the current value $S_3$ of the time when the subtracted value SB exceeds the prescribed value ST (at the time point $t_3$). The memory 24 memorizes the time $T_2$ from the time point $t_2$ to $t_3$. In the manner similar to the foregoing, everytime the difference SB between the refreshed current value and the operation current value exceeds the prescribed value ST, the memory 13 memorizes then current values $S_4$, $S_5$, $S_6$, $S_7$, and $S_8$ respectively while the memory 24 memorizes the duration of time $T_3$, $T_4$, $T_5$, $T_6$, $T_7$ and $T_8$ during which the current values are respectively retained. At the time of model operation, the memory 13 is made to store the value of the load current everytime the value of the current loaded on the motor exceeds a predetermined tolerance scope ($ST_1$ to $ST_2$) while the memory 24 is made to store the time during which the current value respectively remains within such scope.

As described in the foregoing, operation begins after the current value and the time of the model operation are memorized respectively in the memories 13 and 24. At the time of actual operation, the gates 11 and 22 have been deenergized with a switch signal GC. Accordingly, the data stored in the memories 13 and 24 are input timewise to subtracters 12 and 23 by an output CM from the comparative controlling circuit 14 and the current value DI and the time data CV of the actual operation are input into the subtracters 12 and 23, respectively. If a load current of the motor as shown in FIG. 4 is fed, the memory 13 inputs an initial current value $S_1$ to the subtracter 12, to which is also input the motor current value DI of actual operation. Whether the difference $S_1 - L_1 = SB$ is within the prescribed value ST ($ST_1$ to $ST_2$) set at the setter 15 will be sequentially decided. If the current value LI remains between the maximum $ST_1$ and the minimum $ST_2$, the output from the comparative controlling circuit 14 is "0". But if the current value LI exceeds beyond the tolerance scope of the set value ST, for instance, in the case of FIG. 4, where the current value LI exceeds the maximum set value $ST_1$ (the current value $P_1$), the result of the comparison CM by the comparative controlling circuit 14 becomes "1", thereby the time data $T_3$ which corresponds to the position, being input to the subtracter 23. The time data CV which is computed by a counter 21 is also transmitted into the subtracter 23 and the time difference $\Delta T_1$ is computed to be input to the comparator 25. The comparator 25 decides whether the time difference $\Delta T_1$ input from the subtracter 23 is larger than the permissible time STT($\Delta T$) or not and will not output an alarm signal when $\Delta T_1$ is smaller than $\Delta T$. As the result of comparison for the current value $P_1$ indicates that the time difference $\Delta T_1$ is smaller than the set value $\Delta T$, the comparator 25 will not output an alarm signal AL.

The system consecutively continues comparison. Since the time difference $\Delta T_2$ is larger than the permissible time $\Delta T$ at the position $P_2$, the comparator 25 will output an alarm signal AL.

As described in the foregoing, this invention enables to store current values whenever a current value of a motor exceeds a predetermined value, to store the time maintaining such stored current value separately, and to compare the stored data with the data of actual operation to look out overload on the motor, thereby conveniently minimizing the size of memory capacity.

What is claimed is:

1. A method of monitoring a load current passing through a motor for the prevention of an overload, comprising the steps of:

storing a model load current value at a time when a model load current exceeds a predetermined current range during a model operation;

storing the value of a time duration when said model load current remains within said predetermined current range;

comparing the value of a load current of said motor during its actual operation with said stored model current value;

comparing the time duration when the difference obtained from said current value comparison exceeds a predetermined value, with said stored time duration; and detecting whether the difference in said time duration comparison exceeds a predetermined value.

2. The method as claimed in claim 1, wherein said model load current and said time duration are both stored as digital values.

3. The method as claimed in claim 1, wherein said predetermined current range is defined by a maximum value and a minimum value.

4. The method as claimed in claim 1 further comprising the step of generating an alarm signal when said time difference exceeds said predetermined value.

5. The method as claimed in claim 4, wherein said model load current and said time duration are both stored as digital values.

6. The method as claimed in claim 4, wherein said predetermined current range is defined by a maximum value and a minimum value.

7. The method as claimed in claim 1, wherein said model load current is set at an initial value when said model load current exceeds said predetermined current range.

8. The method as claimed in claim 7, further comprising the step of generating an alarm signal when said time difference exceeds said predetermined value.

9. The method as claimed in claim 7, wherein said model load current and said time duration are both stored as digital values.

10. The method as claimed in claim 7, wherein said predetermined current range is defined by a maximum value and a minimum value.

11. A monitoring system for a motor which comprises: a current memory for storing a model load current value at a time when a load current of said motor exceeds a predetermined current range; a time memory for storing a time duration where said model load current remains within said predetermined current range; and a comparative control means which, when the difference between a load current of said motor during its actual operation time and the model load current value stored in said current memory becomes higher than the predetermined value, compares the time value up until that time with the time value stored in said time memory and determines if the difference therebetween exceeds a predetermined value.

12. The monitoring system as claimed in claim 11, wherein said time measurement is controlled by an oscillator which outputs a signal of a predetermined frequency and is further controlled by said comparative control means.

13. The monitoring system as claimed in claim 11, wherein said comparative control means outputs an alarm signal when said time difference exceeds said predetermined value.

14. The monitoring system as claimed in claim 13, wherein said time measurement is controlled by an oscillator which outputs a signal of a predetermined frequency and is further controlled by said comparative control means.

15. The monitoring system as claimed in claim 11, wherein said model load current is set at an initial value when it exceeds said predetermined current range.

16. The monitoring system as claimed in claim 15 wherein said comparative control means outputs an alarm signal when said time difference exceeds said predetermined value.

17. The monitoring system as claimed in claim 15, wherein said time duration measurement which is stored in said time memory is controlled by an oscillator which outputs a signal of a predetermined frequency and if further controlled by said comparative control means.

18. A system of monitoring an overload on a motor by comparing an operating load current detected during its actual operation with a model load current stored during model operation, which comprises:

an A/D converter for converting a measured load current of a motor into a digital value;

a current memory for storing an output from said A/D converter through a first gate; a first subtracter for subtracting said digital value from said current memory;

a current setter for setting a range for the load current; a comparative control circuit for comparing an output from said first subtracter with the set current range from said current setter; an oscillator for outputting clock pulses of a predetermined frequency; a counter for counting the clock pulses; a time memory for storing the count value from said counter through a second gate; a second subtracter for subtracting said count value from said counter from an output from said time memory; a time setter for setting a permissible time range of timewise deviations; and a comparator for outputting an alarm signal by comparing an output from the second subtracter with the said allowable time range; wherein said comparative control circuit controls said current memory, said time memory and said second comparator and a gate switch signal controls said first and second gates and said comparative control circuit.

* * * * *